United States Patent
Fujioka et al.

(10) Patent No.: US 7,210,579 B2
(45) Date of Patent: May 1, 2007

(54) GLASS SHEET PACKING APPARATUS, A GLASS SHEET PACKING METHOD AND A PACKED BODY

(75) Inventors: Masayoshi Fujioka, Kawachi-gun (JP); Tomoyuki Kawazoe, Kashima-gun (JP); Hiroshi Kurino, Tokyo (JP); Taisei Komuro, Hiratsuka (JP); Yoshiaki Hijii, Chita-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/017,822

(22) Filed: Dec. 22, 2004

(65) Prior Publication Data

US 2005/0103670 A1    May 19, 2005

Related U.S. Application Data

(63) Continuation of application No. PCT/JP03/08136, filed on Jun. 26, 2003.

(30) Foreign Application Priority Data

Jun. 26, 2002    (JP) ............... 2002-185433

(51) Int. Cl.
    B65D 85/48    (2006.01)
(52) U.S. Cl. ............ 206/451; 206/454; 206/599; 206/597
(58) Field of Classification Search ........ 206/449, 206/451, 454, 326, 599, 606, 597, 321
    See application file for complete search history.

(56) References Cited

U.S. PATENT DOCUMENTS

| 2,607,475 A | * | 8/1952 | Budd ................ 206/597 |
| 3,927,764 A | | 12/1975 | Fox |
| 4,014,435 A | | 3/1977 | Rowley et al. |

FOREIGN PATENT DOCUMENTS

| DE | 200 00 735 U1 | 6/2000 |
| JP | 63-91486 | 6/1988 |
| JP | 2002-37374 | 2/2002 |

* cited by examiner

*Primary Examiner*—Mickey Yu
*Assistant Examiner*—Jerrold Johnson
(74) *Attorney, Agent, or Firm*—Oblon, Spivak, McClelland, Maier & Neustadt, P.C.

(57) ABSTRACT

A glass sheet packing apparatus has a base plate 3 for supporting a plurality of glass sheets 10 in parallel and upright; a side frame 2 for holding faces of a group of glass sheets loaded on the base plate; and a top frame 4 for holding the top face of the glass sheets loaded on the base plate; wherein the glass sheets are fixed by a band 5 together with the side frame 2 and the top frame. The side frame 2 is a pair of a male frame 6 and a female frame 7, each formed in a L-shape by a vertical square pipe and a horizontal square pipe, the horizontal square pipe of the male frame 6 is inserted into the horizontal square pipe of the female frame 7 to form a letter U like shape.

6 Claims, 8 Drawing Sheets

GLASS SHEET PACKING APPARATUS, A GLASS SHEET PACKING METHOD AND A PACKED BODY

TECHNICAL FIELD

The present invention relates to a glass sheet packing apparatus (pallet) for transporting glass sheets.

BACKGROUND ART

Heretofore, at a time of packing and transporting glass sheets, they have been accommodated in parallel in an wooden box, or bundled with a band such as a steel band after fixing both ends of the glass sheets by cap-shaped boxes for transporting.

However, conventional glass sheet packing apparatuses have been disposed after the use since it is difficult to recover the apparatuses having a bulky box-shape or since they do not have a sufficient strength. Therefore, it has been desired to reuse them to avoid waste of resources.

Meanwhile, a transporting apparatus made of steel has been developed, which has foldable props provided at four corners of a base frame so that they can be folded to recover the apparatus after transporting glass sheets. But such an apparatus has a complicated structure and is large in scale.

The present invention has been made considering the above conventional arts. It is an object of the present invention to provide a glass sheet packing apparatus having a simple construction and a sufficient strength, which is reusable and can be packed into a compact shape when it is returned, a packing method, and a packed body.

DISCLOSURE OF THE INVENTION

The present invention provides, in order to achieve the above object, a glass sheet packing apparatus comprising:

a base plate for supporting a plurality of glass sheets in a parallel and upright state;

a side frame for holding faces of a group of glass sheets loaded on the base plate from its front and back sides; and a top frame for holding the top face of the grouped glass sheets loaded on the base plate;

wherein the grouped glass sheets are fixed by a band together with the side frame and the top frame, the side frame comprises a pair of male and female frames each formed in a L-shape by a vertical square pipe and a horizontal square pipe, the horizontal square pipe of the male frame is inserted into the horizontal square pipe of the female frame to form a letter U like shape, the base plate is placed on horizontal square pipes of the side frame, and the height of the horizontal square pipes is at least a predetermined height.

By such a construction, the side frame bulky in the height direction is constituted by insertion type L-shaped male and female frames so that it can be easily disassembled and assembled, whereby the packing apparatus (pallet) after transporting glass sheets can be disassembled and packed compactly, it is reusable, and it has an improved handling capability at a time of returning. Further, since the side frame is constituted by square pipes, a sufficient strength can be obtained. In this case, since the height of horizontal square pipes underneath the base plate is high (including a case where the height of the pipe member itself is high, and a case where the height is increased by attaching another member to the pipe member), there is an enough space underneath the base plate to insert a fork of a forklift, whereby it becomes possible to easily insert the fork of the forklift to transport the packing apparatus by the forklift to thereby improve the workability.

As a preferred embodiment, a spacer is provided under the horizontal square pipe of the female frame of the side frame, the width of the spacer is substantially the same as the width of the horizontal square pipe, and the spacer is welded to the horizontal square pipe at a position shifted in the width direction.

By such a construction, since the spacer increases the height of the horizontal pipe, the spacer is attached to the horizontal pipe at a position slightly shifted in the width direction, and a fillet formed at a time of welding the spacer underneath the horizontal pipe of the side frame (a fillet is formed at the side where the spacer is shifted out, which is identified by a reference numeral 14a of FIG. 3(B) to be described later) is formed inside from the surface of the spacer and does not protrude in the direction of the frame width. Therefore, when the side frame is disassembled and laid down for piling at a time of recovering the packing apparatuses, the fillets (14a) do not protrude in the vertical direction, the piled members are not inclined by the variation of the fillets, and an upper stage is supported on the surface of the spacer of a lower stage shifted sideways, whereby the stages can be piled up at a constant vertical interval, keeping a horizontal level (refer to FIG. 7 and FIG. 8 to be described).

The shifting amount of the spacer is selected so that the surface of the spacer is on the same plane or preferably protrudes from the surface of a connecting iron plate 81 of the female frame 7, as described later (FIG. 3(B)), whereby the fillet does not protrude from the top surface of the spacer, the iron plate 81 does not protrude from the top surface of the spacer when the side frame is disassembled and laid down to be piled-up, and accordingly, another disassembled packing apparatus can be piled-up stably on the top surface of the spacer. Here, in a case where the spacer is welded only to a horizontal square pipe 7b (FIG. 3) of the female frame, even if the surface of the spacer is on the same plane as the connecting iron plate (even if it does not protrude from the surface of the iron plate), it is possible to prevent the fillet from protruding from the surface of the spacer within a range of the thickness of the iron plate.

The shifting amount of the spacer is preferably at most a half of the width of the horizontal pipe of the female frame 7, considering the stability at a time of packing glass sheets and securing the strength of welding of the spacer. Further, the shifting directions of two female frames are preferably the same considering the stability when side frames are disassembled and laid down to be piled-up (refer to FIG. 2(B) to be described).

In the preferred embodiment, both ends of the top frames are inclined so that a trapezoidal shape is exhibited in its left and right sides.

By such a construction, at a time of bundling by a band such as a steel band, the band is not bent at a right angle but curved at a shallow angle along the trapezoid, whereby strong bundling is possible. Further, deformation, wearing, breakage and so on of e.g. the top frame and the steel band can be prevented.

In a preferred embodiment, the width of the top frame is sufficiently wider than the width of the horizontal square pipe of the female frame of the side frame.

By such a construction, when the packing apparatuses accommodating glasses are piled up in two stages, the horizontal pipes in the lower part of the side frame of the upper side packing apparatus is securely supported on the top frame of the lower side packing apparatus without shifting, and accordingly, the pile of the packing apparatuses can be made stably without collapsing.

Further, the present invention provides a packing method for glass sheets employing the glass sheet packing apparatus comprising:

resting glass sheets sequentially against the vertical square pipe of the female frame of the side frame in a state that the female frame is separated from the male frame, whereby a predetermined number of glass sheets are arranged;

inserting the horizontal square pipe of the male frame into the horizontal square pipe of the female frame; and bundling a group of the glass sheets with the belts.

By such a construction, the side frame is constituted by insertion type L-shaped male and female frames, whereby glass sheets can be loaded in a state that the male frame is separated from the female frame and only the L-shaped female frame remains, which makes loading easy. Further, the side frame can be easily assembled only by inserting the male frame after the loading, whereby the workability of the packaging is improved.

In the preferred embodiment, the packing method for packing the packing apparatus at a time of recovering, comprises piling a plurality of packing apparatuses wherein side frames and top frames are placed on base plates so that the side frames are laid down with spacers projected upwardly and the plurality of packing apparatuses.

By such a construction, since the side frame is laid down so that the spacer attached to the side frame slightly shifted in the width direction, is projected upwardly, and the upper stage is supported on the surface of the spacer shifted sideways in the lower stage when the apparatuses are piled-up, whereby the stages can be piled up at a constant vertical interval as they are horizontally arranged.

Further, the present invention provides a packed body of glass sheets comprising:

a plurality of glass sheets;

a base plate for supporting a plurality of glass sheets in a parallel and upright state;

a side frame for holding faces of a group of glass sheets loaded on the base plate from its front and back sides; and a top frame for holding the top face of the grouped glass sheets loaded on the base plate;

wherein the grouped glass sheets are fixed by a band together with the side frame and the top frame, the side frame comprises a pair of male and female frames each formed in a L-shape by a vertical square pipe and a horizontal square pipe, the horizontal square pipe of the male frame is inserted into the horizontal square pipe of the female frame to form a letter U like shape, the base plate is placed on horizontal square pipes of the side frame, and the height of the horizontal square pipes is at least a predetermined height.

By such a construction, the side frame bulky in the height direction is constituted by insertion type L-shaped male and female frames so that it can be easily disassembled and assembled, whereby the packing apparatus (pallet) after transporting glass sheets can be disassembled and packed compactly, it is reusable, and it has an improved handling capability at a time of returning. Further, since the side frame is constituted by square pipes, a sufficient strength can be obtained. In this case, since the height of the horizontal pipe underneath the base plate is high (including a case where the height of the pipe member itself is high, and a case where the height is increased by attaching another member to the pipe member), there is an enough space underneath the base plate to insert a fork of a forklift, whereby it becomes possible to easily insert the fork of the forklift to transport the apparatus by the forklift to thereby improves the workability.

Further, as a packed body of glass sheet packing apparatus in a recovered state for the above-mentioned packing apparatus, the present invention provides a packed body of glass sheet packing apparatuses in a recovered state characterized in that a recovered packed body is formed by piling a plurality of packing apparatuses wherein a base plate is separated from a side frame in each packing apparatus and the side frame and a top frame are placed on the base plate so that the side frame is laid down with a spacer projected upwardly, and bundling the plurality of packing apparatuses.

By such a construction, since the side frame is laid down so that the spacer attached to the side frame slightly shifted in the width direction, is projected upwardly, and the upper stage is supported on the surface of the spacer slightly shifted sideways in the lower stage when they are piled-up, whereby the stages can be piled up at a constant vertical interval as they are horizontally arranged.

BEST MODE FOR CARRYING OUT THE INVENTION

Now, a glass sheet packing apparatus according to the present invention will be described with reference to drawings.

Figure 1:
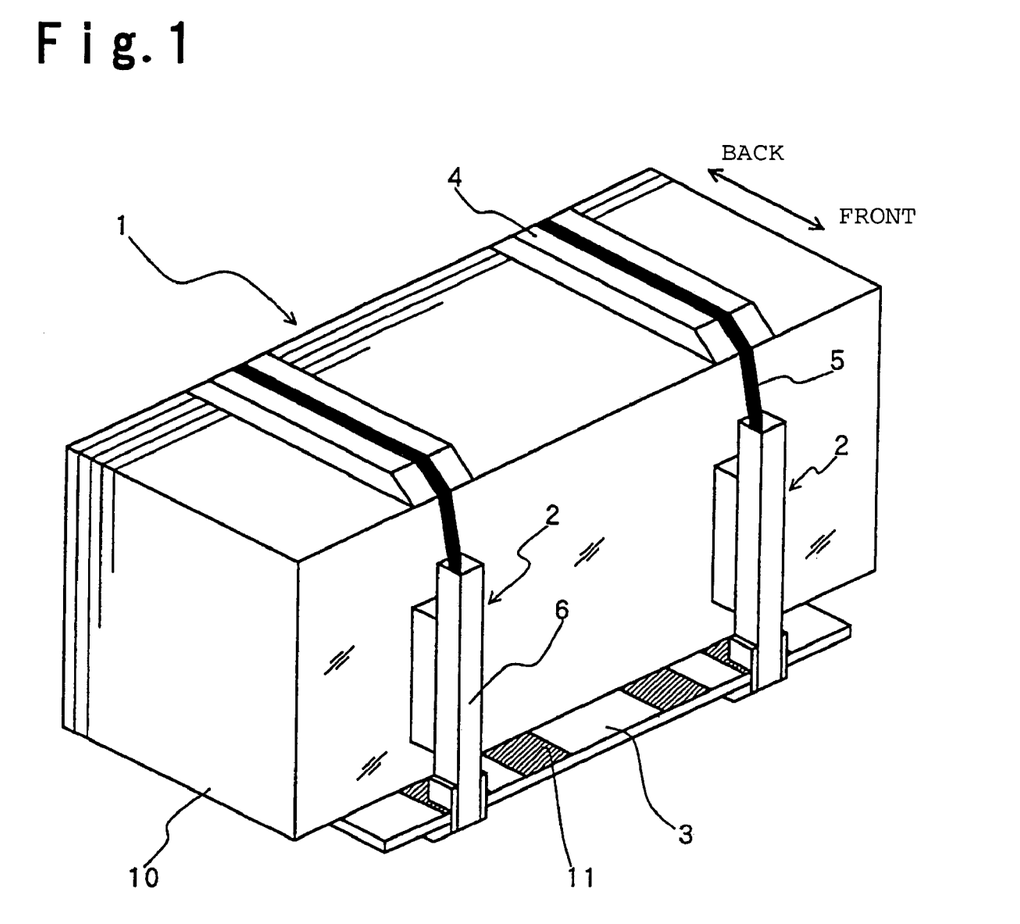
FIG. 1 is a perspective view of a glass sheet packing apparatus according to the present invention.
Figure 2A:
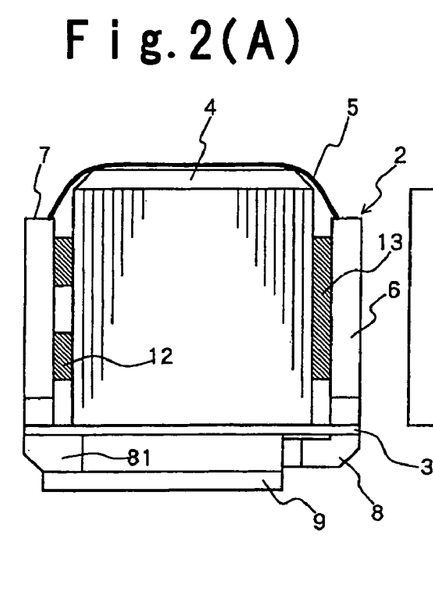
FIG. 2(A) is a side view of the glass sheet packing apparatus according to the present invention.
Figure 2B:
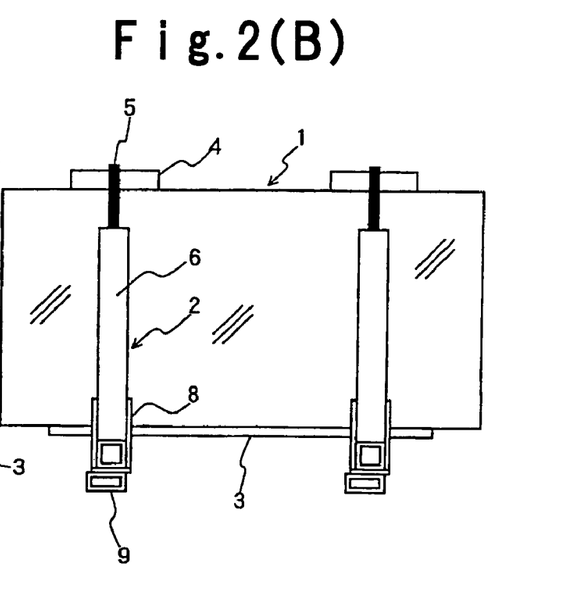
FIG. 2(B) is a front view of the glass sheet packing apparatus according to the present invention.
Figure 2C:
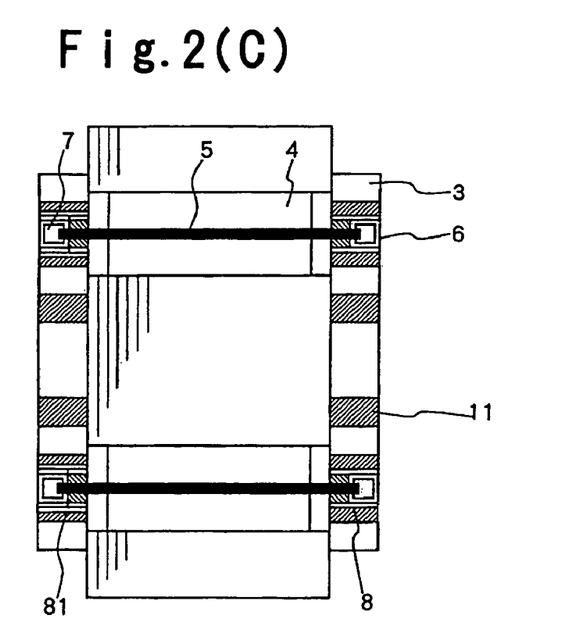
FIG. 2(C) is a top view of the glass sheet packing apparatus according to the present invention.

FIG. 1 is a perspective view of a glass sheet packing apparatus according to the present invention, FIG. 2(A) is a side view, FIG. 2(B) is a front view and FIG. 2(C) is a top view.

As illustrated in the drawings, the glass sheet packing apparatus according to the present invention is constituted by side frames 2 of a letter U like shape, a base plate 3 such as a veneer board, top frames 4 and bands 5 such as steel bands. The side frames 2 each consists of a male frame 6 and a female frame 7 each having an L-shape formed by assembling square steel pipes. The male frame 6 and the female frame 7 are each constituted by two square pipes (a vertical square pipe and a horizontal square pipe) to form an L-shape (refer to FIG. 3 and FIG. 4). In the male frame 6, the pipes are connected with an iron plate 8, and in the female frame 7, the pipes are connected with an iron plate 81. The horizontal square pipe constituting the female frame 7 has an aperture size larger than the aperture size of the horizontal square pipe of the male frame 6. The side frame 2 of the letter U like shape is formed by inserting the horizontal square pipe of the male frame 6 into the horizontal square pipe of the female frame 7. A spacer 9 is attached at the bottom side of the horizontal square pipe of the female frame 7 (refer to FIG. 3 and FIG. 4). By attaching the spacer 9, a sufficient space is formed underneath the base plate 3, whereby it becomes possible to insert easily a fork of a forklift when the packing apparatus is transported by the forklift.

To proper portions (in four rows in the figure) of the base plate 3, cushion members 11 such as rubber are attached, whereby supported glass sheets 10 can be protected and slipping of the glass sheets can be prevented. Both ends of each of top frames 4 are cut to be inclined so that a trapezoidal shape having a short top side is exhibited in a side view. The top frames 4 are placed on the top surface of the glass sheets 10 to press the group of glass sheets from the top. Specifically, each of them is formed by cutting obliquely both ends of a square pipe made of a steel, and capping (which may be omitted) the cut portions. By such a structure, deformation of the top frame 4 can be prevented at a time of bundling by the band 5, and the bundling force of the band 5 can be increased. The band 5 is passed through the vertical and horizontal square pipes of the side frame 2, and extended on the top frame 4 for bundling, whereby the glass sheets 10 are fixed and held in the glass sheet packing apparatus 1. In this case, since both ends of the top frame 4 are obliquely cut, the band 5 is not bent at a right angle at both ends of the top frame but curved at a shallow angle along the slope when the band 5 bundles the top side of the top frame 4, whereby deformation, wearing and breakage of the top frame 4 and the band (steel band) 5, are prevented.

Here, the band 5 may be passed through the inside of the above-mentioned top frame 4 for bundling without capping the top frame 4. The material of the side frame 2 and the top frame 4 may be a material other than a steel such as an aluminum. However, it is preferably a steel from a viewpoint of the strength and cost.

When the glass sheets 10 are packed by employing the glass sheet packing apparatus 1 according to the present invention, the glass sheets are placed on the base plate 3 sequentially from a side of the female frame 7 (back side in FIG. 1) in a state that the male frames 6 of the side frames 2 are taken out or apart from the female frame 7, so that they are in a parallel and upright state. Cushion members 12 are provided in advance to portions of each of the female frame 7 where the surface of the glass sheet is in contact. When a predetermined number of the glass sheets 10 are placed on the base plate 3 and a group of glass sheets is formed, the male frames 6 are inserted into the female frames 7, a cushion member 13 is sandwiched between each of the male frames and the glass sheets 10, and the male frames 6 are pushed towards the surface of the glass sheet. In this case, the depth of insertion of the male frames 6 can be adjusted depending on the number of the glass sheets. The top frames 4 are placed on the top surface of the group of glass sheets 10, and the bands 5 are each passed through the vertical and horizontal pipes of the side frame 2, and tightened for bundling with a fastening tool (not shown) from the top of the top frame or from the front or back side of the glass sheets.

Here, the material of cushion members 12 and 13 may be rubber or a hard sponge, but preferably rubber from a viewpoint of durability and cost.

Figure 9:
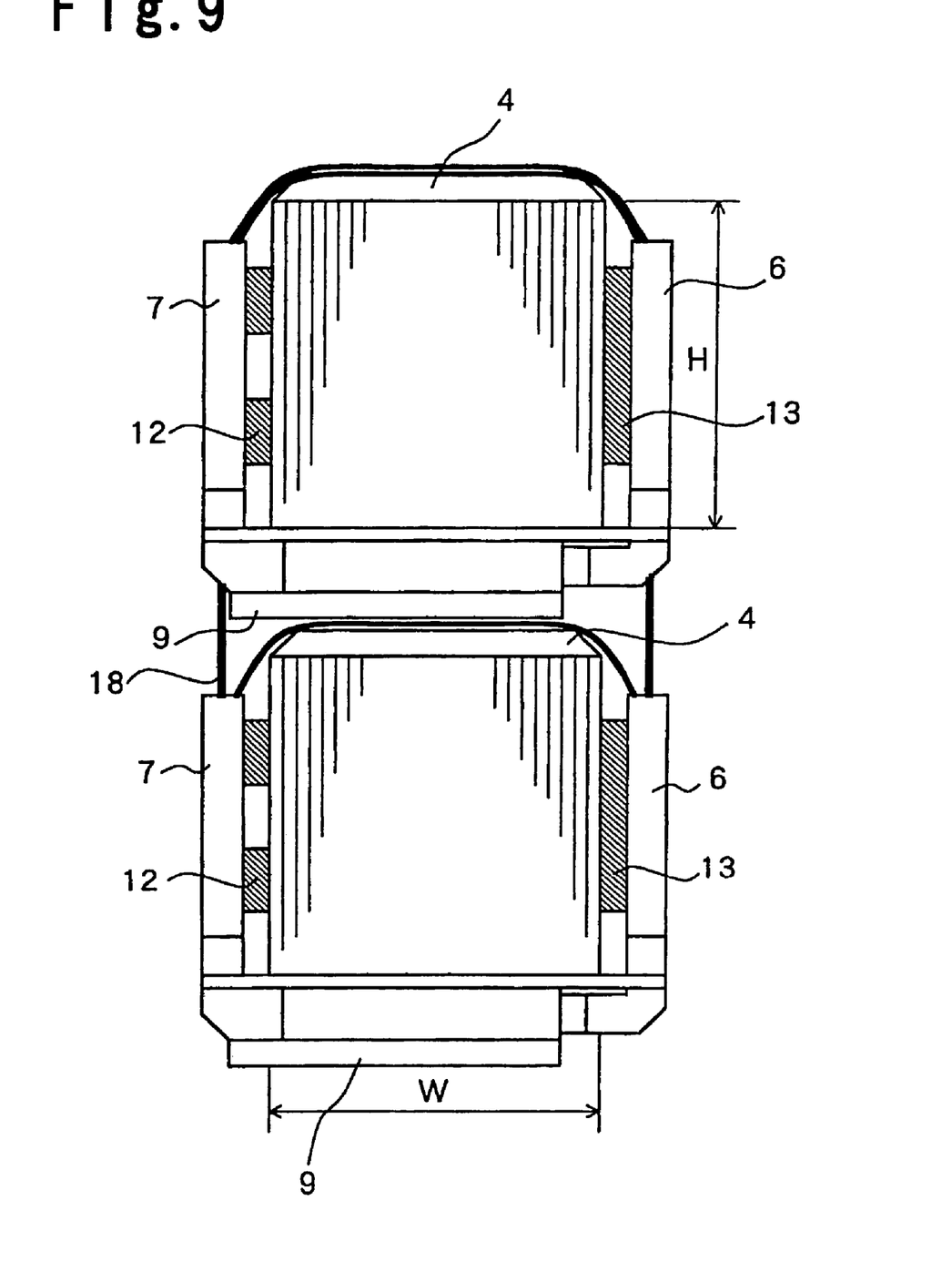
FIG. 9 is a side view showing an embodiment of packing employing the packing apparatus of the present invention.

In a case where the height H of a glass is relatively low and the size W of loading depth is relatively large (H=425 to 875 mm, W=550 to 650 mm in this example), the glass sheets 10 thus packed is transported in a state that the glass sheet packing apparatuses 1 are piled up in two stages (FIG. 9). Specifically, on the top of the top frame 4 of the packing apparatus in the first stage, the spacer 9 underneath the base plate 3 of the packing apparatus in the second stage is placed. In this state, the packing apparatus in two stages is bundled by using steel bands 18 (FIG. 9). In this case, the width of the top frames 4 is made to be sufficiently wider (for example, 4 to 5 times) than the spacer 9 so that the packing apparatus at the upper stage can be easily placed. Further, cushion members (not shown) are attached on the top and bottom sides of the top frames 4. By such a structure, the group of glass sheets in each of the packing apparatuses can be protected and securely pressed from the top, the packing apparatuses piled up in two stages do not shift from each other, and the steel bands bite into the cushion member, whereby the bundling can be securely achieved.

Figure 10:
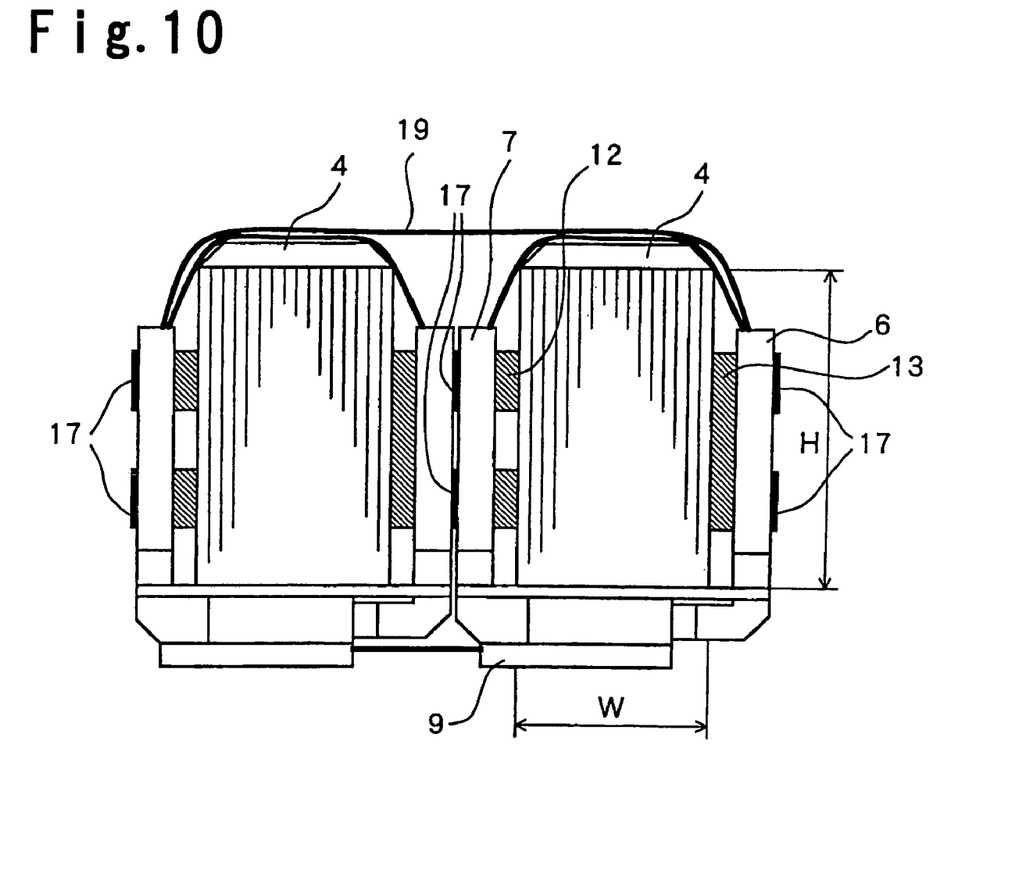
FIG. 10 is a side view showing another embodiment of packing employing the packing apparatuses of the present invention.

On the other hand, in a case where the glass height H is relatively high and the size W of loading depth is relatively small (in this example, H=750 to 1250 mm, W=350 to 450 mm), the packing apparatuses 1 are horizontally arranged in two rows to be transported (FIG. 10). Specifically, on the front side or back side of one packing apparatus, another packing apparatus is arranged so that their side frames 2 are in contact with each other. In this state, the two rows of packing apparatuses are bundled by e.g. steel bands 19 (FIG. 10).

Thus, depending on the size or the state of the glasses loaded, piling-up in two stages or arranging in two rows for binding can be appropriately selected. Accordingly, the safeness can be secured at a time of transportation and storage, and transportation work can be simplified.

Here, if there is a cushion member (such as rubber) as identified by a numeric symbol 17 in FIG. 10 on the side of the frame opposite from the glass sheets, the two-row arrangement can be prevented from disordering, and the glass sheets can be protected from breakage even in a case other than the two-row arrangement.

Figure 3A:
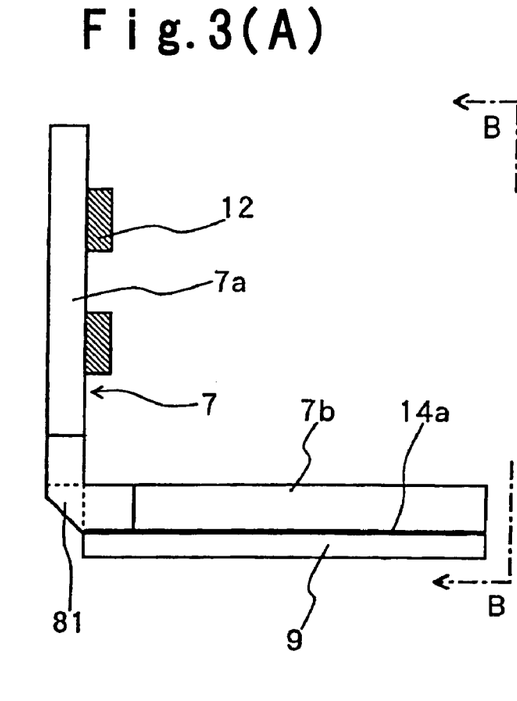
FIG. 3 is a schematic view of a female frame and a male frame.
Figure 3B:
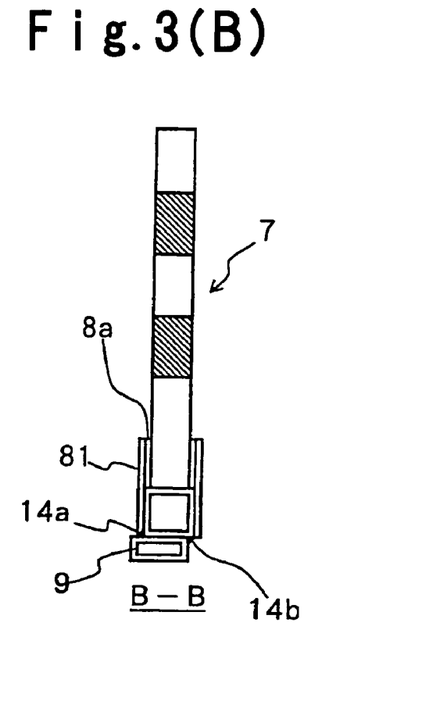
Figure 3C:
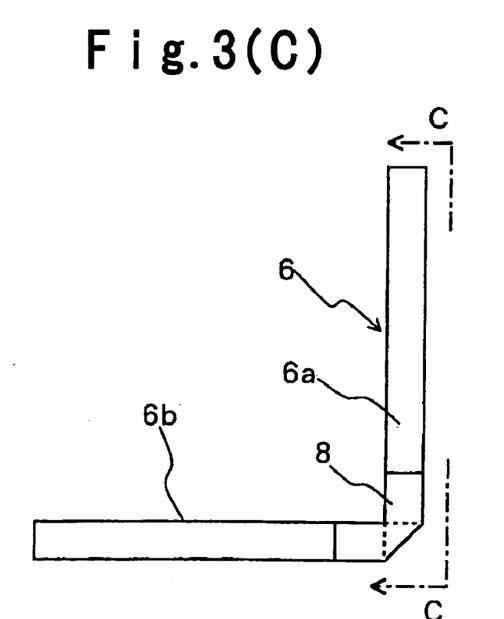
Figure 3D:
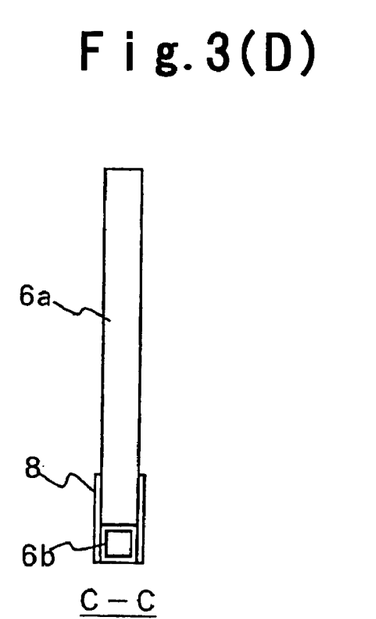
Figure 4:
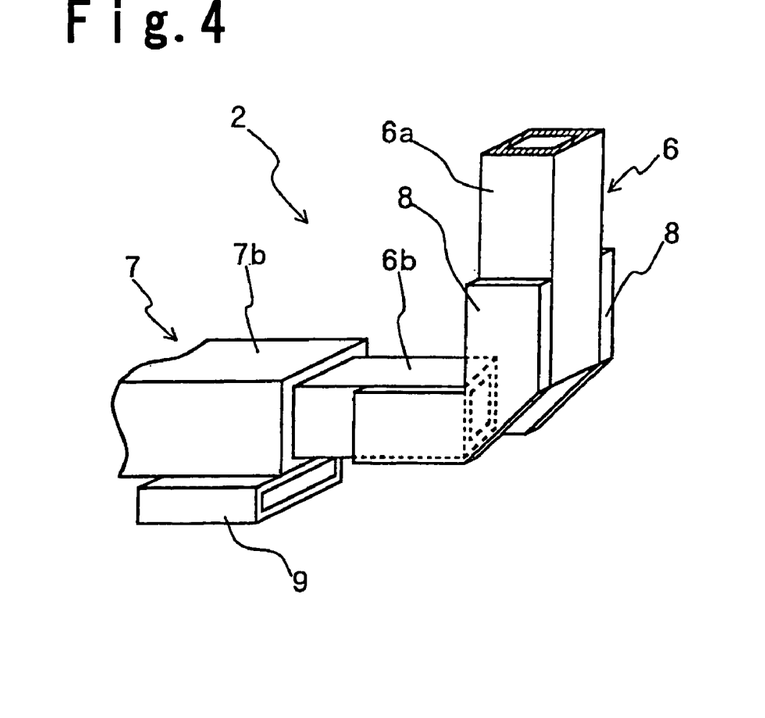
FIG. 4 is a perspective view of a corner portion when the female frame and the male frame are assembled.

FIGS. 3(A) and 3(B) are schematic views of the female frame, and FIGS. 3(C) and 3(D) are schematic views of the male frame. FIG. 4 is a perspective view of the corner portion when the female frame and the male frame-are engaged.

The structure of the female frame 7 is, as illustrated in FIGS. 3(A) and 3(B), that the vertical square pipe 7a and the horizontal square pipe 7b are connected by an iron plate 81 to form an L-shape. As shown in FIG. 3(B), the spacer 9 is welded to the female frame 7 so that the center of the spacer 9 is slightly shifted in the width direction from the central axis of the female frame 7 (so that the side of the spacer 9 protrudes from the outer surface of the iron plate 81), whereby fillets 14a and 14b are formed on both sides of the spacer 9. In this case, since the surface of the spacer 9 is on the same plane or preferably protrudes from the outer surface of the iron plate 81, as shown in FIG. 3(B), a fillet 14a on the protruded side of the spacer 9 does not protrude from the protruded side surface of the spacer 9. Further, a fillet 14b on the other side of the spacer 9 is formed at a position stepped back from the outer surface of the female frame 7 as shown in the figure. Therefore, when the side frames are laid down for recovering the packing apparatus 1 (to be described later), the fillet 14*a* does not protrude upwardly, inclination or unstability in the piling due to the fillet 14*a* can be prevented, and the packing apparatuses can be piled up as they are horizontally arranged.

Here, in a case where the spacer 9 is welded only to the horizontal square pipe 7*b* of the female frame 7, even if the side of the spacer 9 is on the same plane as the connecting iron plate 81 (i.e., even if the spacer 9 does not protrude from the surface of the iron plate 81), it is possible to form the fillet 14*a* so as not to extrude from the side of the spacer 9 within the thickness of the iron plate 81.

As described above, the female frame 7 is formed by assembling a vertical square pipe 7*a* and a horizontal square pipe 7*b* in a L-shape, sandwiching the corner portion with the iron plates 81 from both sides and welding them for fixing. Since the horizontal square pipe 7*b* has a aperture size larger than the vertical square pipe 7*a*, auxiliary plates 8*a* are interposed inside the iron plates 81.

The male frame 6 is formed by assembling a vertical square pipe 6*a* and a horizontal square pipe 6*b* in a L-shape, sandwiching the corner portion with the iron plates 8 and welding them for fixing. The horizontal square pipe 6*b* is, as shown in FIG. 4, inserted in the horizontal square pipe 7*b* of the female frame 7 to form the side frame 2 of a letter U letter like shape.

Figure 5:
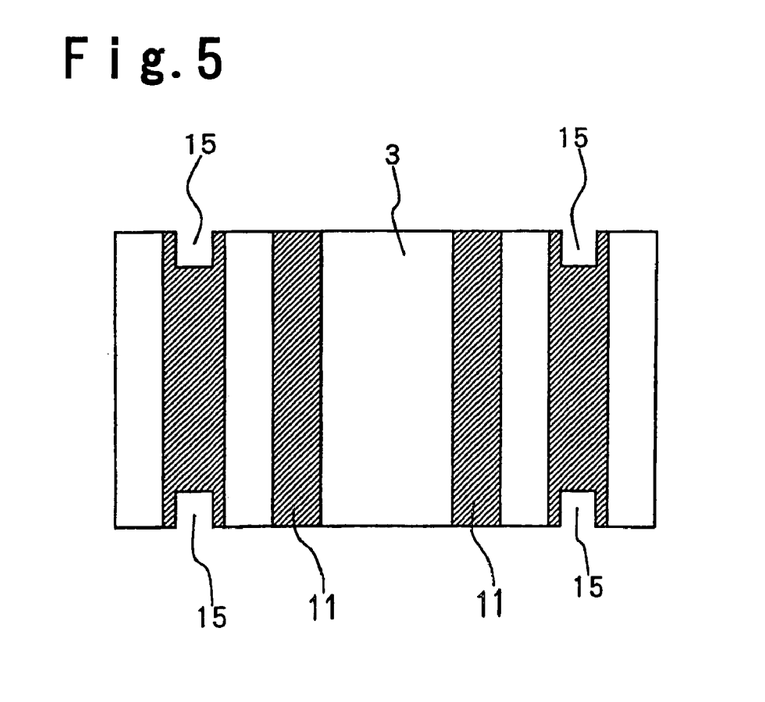
FIG. 5 is a schematic view of a base plate.

FIG. 5 is a schematic view of a base plate. As illustrated, the base plate 3 has a substantially rectangular shape having two notches 15 on each of the long sides (total four notches) opposite from each other. When the packing apparatus is assembled, the side frames 2 are fit into the notchs 15. On the surface, four cushion members 11 for protecting the glass sheets and preventing slipping, are attached. Here, a cushion member 11 may be provided over entire surface of the base plate 3. However, if the cushion member 11 is divided into pieces and attached with spaces therebetween like this example, the air permeability and the draining capability can be sufficiently maintained even if moisture is generated. Further, the material of the cushion member 11 may be rubber or a hard sponge. It is preferably rubber from a viewpoint of durability and cost.

Figure 6:
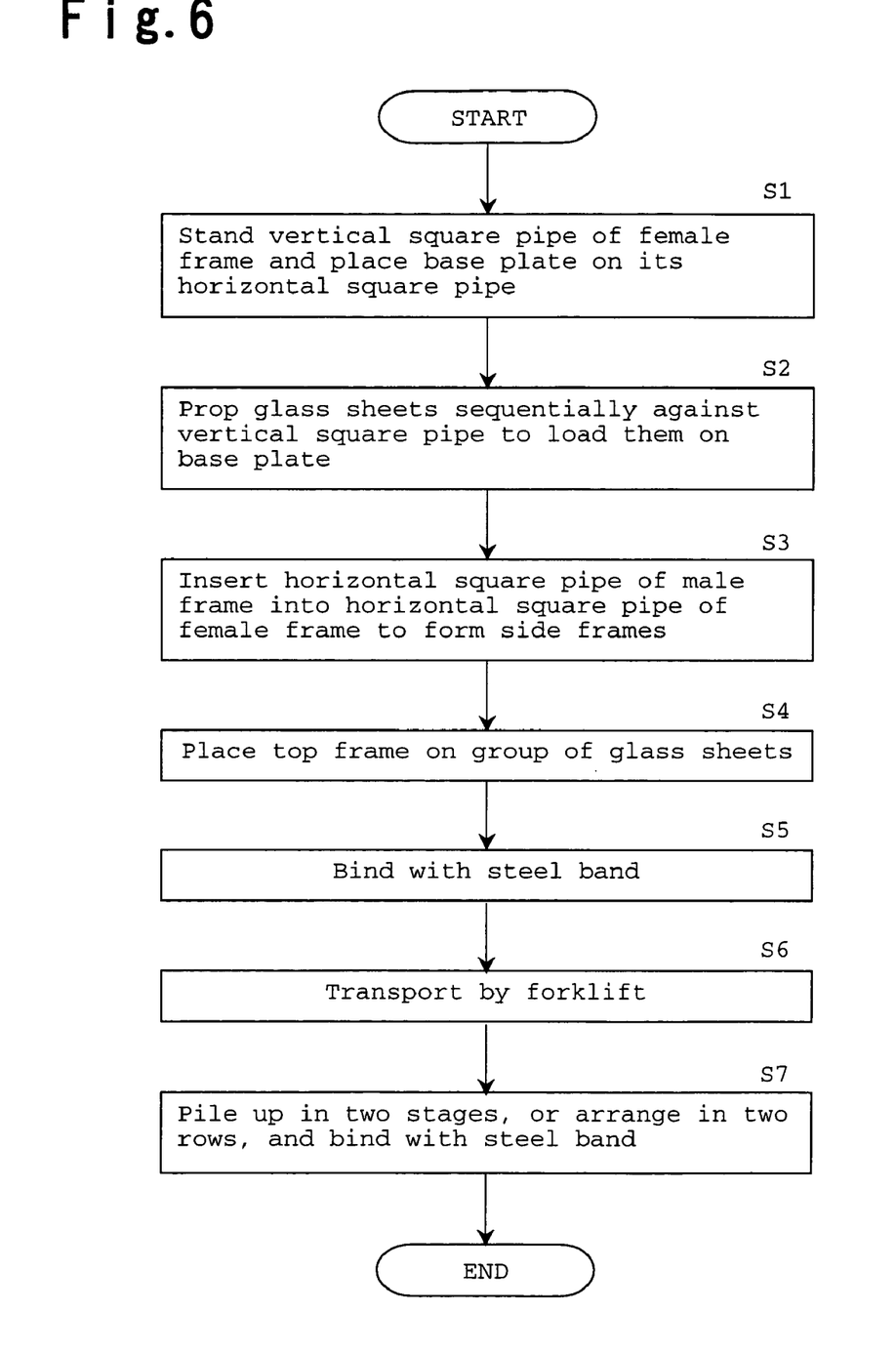
FIG. 6 is a flow chart showing a packing method of glass sheets according to the present invention.

FIG. 6 is a flow chart showing a packing method of glass sheets according to the present invention.

When the glass sheets are packed by employing the glass sheet packing apparatus according to the present invention, the base plate is placed on the horizontal square pipes of the female frames in a state that the vertical horizontal pipes of them are upright (Step S1), and glass sheets are sequentially placed upright on the base plate from the side of the vertical square pipes of the female frames (Step S2). Then, the horizontal square pipes of the male frames are inserted into the horizontal square pipes of the female frames to form side frames (Step S3), and top frames are placed on the group of the glass sheets placed on the base plate (Step S4). Then, they are bundled by bands such as steel bands (Step S5) to form a packed body. The packed body is transported by a forklift (Step S6), placed on another packed body to form a two-stage pile, or arranged in parallel in two rows so that the packed body is placed in the front side of another packed body and their side frames are in contact with each other, and these two packed bodies are bundled by bands such as a steel bands (Step S7).

Figure 7:
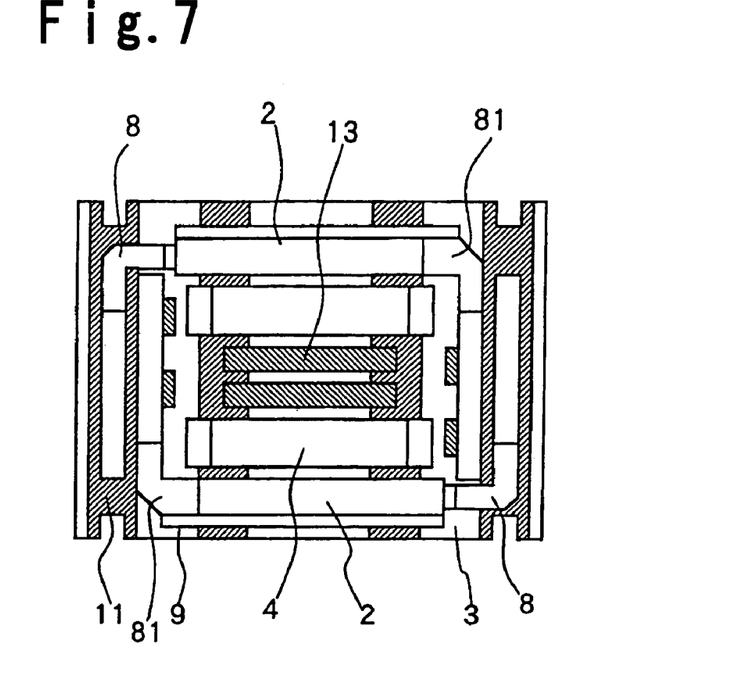
FIG. 7 is a schematic view showing the packing apparatus according to the present invention when it is recovered.

FIG. 7 is a schematic view showing the packing apparatus according to the present invention when it is recovered. As illustrated, the packing apparatus is disassembled and formed into a predetermined shape for recovering after transporting glass sheets. Specifically, on the base plate 3, the side frames 2 are laid down so that they are opposed from each other. The top frames 4 and the cushion members 13 are placed between them. By making the packing apparatus have such a structure, it can be disassembled to form a compact shape at a time of recovering, all parts can be placed on the base plate 3, and therefore it is easily handled. Further, all parts do not likely slip by the effect of cushion member 11 provided on the base plate 3, whereby it is possible to securely hold them in predetermined positions to reduce the possibility of loosing them.

Here, the material of cushion members 11, 12, 13 and 17 and the top and the bottom surfaces of the top frames, is preferably rubber as described above, but its hardness can be selected such a manner that it is 70° (considering durability) in a case where the rubber is used for a plane in contact with glass sheets and it is 60° (considering impact-resisting property) in other cases.

Figure 8:
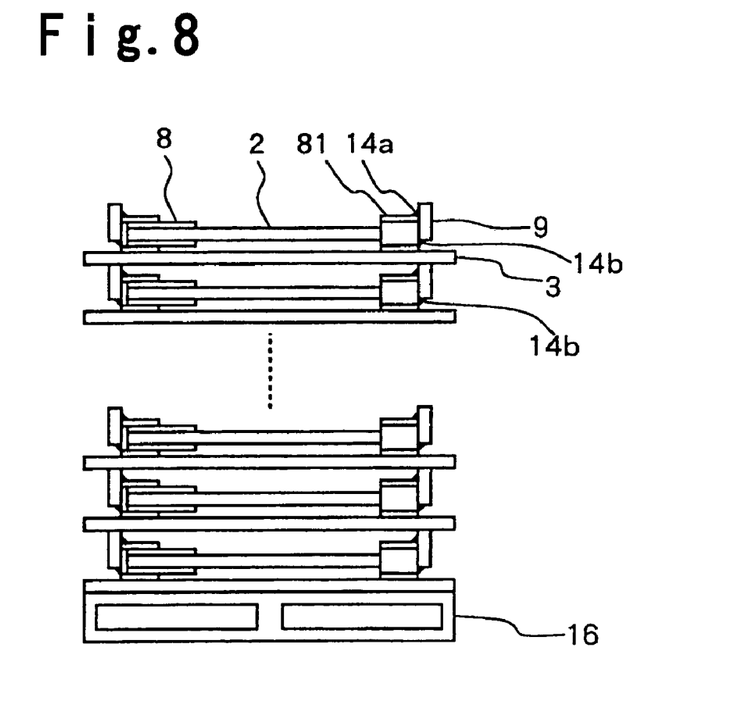
FIG. 8 is a schematic view showing a pile of the packing apparatuses according to the present invention when they are recovered.

FIG. 8 is a schematic view showing a state of a pile of packing apparatuses according to the present invention when they are recovered.

The packing apparatuses each disassembled as shown in FIG. 7 for recovering, are piled up in plurality of stages (for example, 10 stages). Here, as described above, since the spacers 9 are attached to the female frames 7 in positions slightly shifted, the fillets 14*a* do not protrude upwardly. Therefore, the piled-up base plates 3 are not inclined by the variation of the height of the fillets 14*a*, and can be piled up at a constant vertical interval as they are horizontal by the effect of the spacers 9. Thus, the packing apparatuses can be piled up compactly and stably at a time of recovering them, which improves the workability. The packing apparatuses piled up are bundled by bands such as steel bands (not shown), and placed on a skid 16 in which a fork of a forklift is inserted, and transported to be recovered.

INDUSTRIAL APPLICABILITY

In the present invention, the side frame bulky in the height direction is constituted by insertion type L-shaped male and female frames so that it can be easily disassembled and assembled, whereby the packing apparatus (a pallet) after transporting glass sheets, can be disassembled and packed compactly, it is reusable and it has an improved handling capability at a time of returning. Further, since the side frame is constituted by square pipes, a sufficient strength can be obtained. In this case, since the height of the horizontal square pipes underneath the bottom plate is high (including a case where the height of the pipe member itself is high, and a case where the height is increased by attaching another member to the pipe member), there is an enough space underneath the base plate to insert a fork of a forklift, whereby it becomes possible to easily insert the fork of the forklift to transport the packing apparatus by the forklift, to thereby improves the workability.

Further, since the spacer increases the height of the horizontal square pipe and the spacer is attached at a position slightly shifted in the width direction, a fillet formed at a time of welding the spacer underneath the horizontal square pipe of the side frame is formed inside from the surface of the spacer and does not protrude in the direction of the frame width. Therefore, when the side frame is disassembled and laid down for piling at a time of recovering the packing apparatuses, the fillets do not protrude in the vertical direction, the piled members are not inclined by the variation of the fillets, and an upper stage is supported on the surface of the spacer of a lower stage shifted sideways, whereby the stages can be piled up at a constant vertical interval as they are horizontally arranged.

Further, both ends of the top frame are inclined so that its left and right sides have a trapezoidal shape, whereby the band is not bent at a right angle but curved at a shallow angle along the trapezoid at a time of bundling a band such as a steel band, and strong binding is possible.

Further, the width of the top frame is made sufficiently wider than the width of the horizontal square pipe of the female frame of the side frame, whereby when the packing apparatuses accommodating glass sheets are piled up in two stages, the horizontal square pipes in the lower part of the side frame of the upper side packing apparatus, is securely supported on the top frame of the lower side packing apparatus, without shifting, and accordingly, the pipe of the packing apparatuses can be made stably without collapsing.

The entire disclosure of Japanese Patent Application No. 2002-185433 filed on Jun. 26, 2002 including specification, claims, drawings and summary is incorporated herein by reference in its entirety.

What is claimed is:

1. A glass sheet packing apparatus comprising:
   a base plate for supporting a bottom edge of a group of glass sheets in a parallel and upright state;
   at least two side frames for supporting the base plate, each side frame comprising a pair of male and female frames each formed in an L-shape by a vertical square pipe and a horizontal square pipe, the horizontal square pipe of the male frame being inserted into the horizontal square pipe of the female frame to form a letter U like shape, the base plate being supported by the horizontal square pipes of each female frame, each female frame further including a spacer welded under the horizontal square pipe of that frame;
   wherein, as seen in a horizontal direction that reveals the width of the frames and that additionally is transverse to a horizontal direction where the frames are seen to be formed in a L-shape:
      the width of the spacer is substantially the same as the width of the horizontal square pipe of the female frame to which the spacer is welded, and,
      the spacer is shifted in a width direction such that the spacer is offset laterally relative to the horizontal square pipe of the female frame to which the spacer is welded;
   a top frame for holding a top edge of the grouped glass sheets loaded on the base plate; and
   a band for fixing the group of glass sheets to the side frame and the top frame.

2. The glass sheet packing apparatus according to claim 1, wherein the top frame includes a length defined by opposing ends, both ends being inclined so as to give the top frame a trapezoidal shape.

3. The glass sheet packing apparatus according to claim 2, wherein the top frame has a width that is wider than the width of the horizontal square pipe of the female frame.

4. A packing method for packing a plurality of the glass sheet packing apparatuses each defined in claim 1 at a time of recovering them, comprising:
   piling a plurality of the packing apparatuses wherein the side frames and top frames are placed on the base plates so that the side frames are laid down with the spacers projected upwardly; and
   bundling the plurality of packing apparatuses.

5. A packed body of glass sheet packing apparatuses each defined in claim 1 in a recovered state, wherein the recovered packed body is formed by:
   piling a plurality of packing apparatuses wherein the side frames and top frames are placed on the base plates so that the side frames are laid down with the spacers projected upwardly, and
   bundling the plurality of packing apparatuses.

6. A packaging method for glass sheets comprising:
   providing a base plate for supporting a bottom edge of a group of glass sheets in a parallel and upright state;
   providing at least two side frames for supporting the base plate, each side frame comprising a pair of male and female frames each formed in an L-shape by a vertical square pipe and a horizontal square pipe, the horizontal square pipe of the male frame being inserted into the horizontal square pipe of the female frame to form a letter U like shape, the base plate being supported by the horizontal square pipes of each female frame, each female frame further including a spacer welded under the horizontal square pipe of that frame;
   wherein, as seen in a horizontal direction that reveals the width of the frames and that additionally is transverse to a horizontal direction where the frames are seen to be formed in a L-shape:
      the width of the spacer is substantially the same as the width of the horizontal square pipe of the female frame to which the spacer is welded, and,
      the spacer is shifted in a width direction such that the spacer is offset laterally relative to the horizontal square pipe of the female frame to which the spacer is welded;
   resting the group of glass sheets sequentially against the vertical square pipe of the female frame of the side frames such that the female frame is separated from the male frame, whereby a predetermined number of glass sheets are arranged;
   inserting the horizontal square pipe of the male frame into the horizontal square pipe of the female frame;
   adjusting the depth of insertion of the male frame;
   providing a top frame for holding a top edge of the grouped glass sheets loaded on the base plate; and
   fixing the group of glass sheets to the side frame and the top frame with a band.

* * * * *